United States Patent [19]

Miura et al.

[11] Patent Number: 4,838,657
[45] Date of Patent: Jun. 13, 1989

[54] LIQUID CRYSTAL SHUTTER

[75] Inventors: Teiji Miura; Hideo Yamazaki; Nobumasa Abe; Toshihide Okamura; Hideki Morozumi; Tatsuki Matsuo, all of Nagano, Japan

[73] Assignee: Seiko Epson Corporation, Tokyo, Japan

[21] Appl. No.: 798,093

[22] Filed: Nov. 14, 1985

[30] Foreign Application Priority Data

Nov. 15, 1984 [JP] Japan ................. 59-241295
Jul. 22, 1985 [JP] Japan ................. 60-161542

[51] Int. Cl.⁴ .................................. G02F 1/37
[52] U.S. Cl. .................. 350/336; 252/299.63; 350/346; 350/350 R; 355/200
[58] Field of Search ............ 350/336, 346, 350 R, 350/332, 341; 355/3 R; 252/299.63

[56] References Cited

U.S. PATENT DOCUMENTS

| | | | |
|---|---|---|---|
| 3,953,491 | 4/1976 | Steinstrasser et al. | 350/350 R |
| 4,279,771 | 7/1981 | Shionozaki et al. | 350/350 R |
| 4,297,022 | 10/1981 | Lester | 350/331 R |
| 4,378,956 | 4/1983 | Lester | 355/3 R |
| 4,478,741 | 10/1984 | Nakagawa et al. | 350/350 R |
| 4,559,161 | 12/1985 | Takei et al. | 350/350 R |
| 4,569,574 | 2/1986 | Masaki et al. | 350/336 |
| 4,589,732 | 5/1986 | Shiraishi et al. | 350/332 |
| 4,595,259 | 6/1986 | Perregaux | 350/341 |
| 4,609,256 | 9/1986 | Nakamura | 350/346 |
| 4,636,817 | 1/1987 | Masaki | 350/336 |

FOREIGN PATENT DOCUMENTS

54-59196 12/1979 Japan .................. 350/336

Primary Examiner—John K. Corbin
Assistant Examiner—Martin Lerner
Attorney, Agent, or Firm—Blum Kaplan

[57] ABSTRACT

A liquid crystal light shutter having means for stabilizing molecular orientation of a liquid crystal material is provided. In one embodiment of the invention, isolation electrodes are provided parallel to and between adjacent common electrodes on a substrate. In an alternate embodiment, the effective gap distance between adjacent common electrodes is at least ten times greater than the distance between opposing substrates.

18 Claims, 7 Drawing Sheets

I  0.42 msec.
   TRANSMITTED
   LIGHT QUANTITY

II  0.44 msec.
    TRANSMITTED
    LIGHT QUANTITY

III  0.46 msec.
     TRANSMITTED
     LIGHT QUANTITY

IV  0.48 msec.
    TRANSMITTED
    LIGHT QUANTITY

I 0.42 msec.
TRANSMITTED
LIGHT QUANTITY

II 0.44 msec.
TRANSMITTED
LIGHT QUANTITY

III 0.46 msec.
TRANSMITTED
LIGHT QUANTITY

IV 0.48 msec.
TRANSMITTED
LIGHT QUANTITY

FIG. 11

LIQUID CRYSTAL SHUTTER

BACKGROUND OF THE INVENTION

This invention relates to a liquid crystal display device and, in particular, to a liquid crystal shutter including a nematic liquid crystal having a frequency dependent dielectric anistropy.

Prior art liquid crystal shutters are arranged so that a nematic liquid crystal material having a frequency dependent dielectric anistropy is enclosed in a space between opposed cooperating electrodes. A high frequency signal of about 70 KHz and a low frequency signal of about 500 Hz are selectively applied to the electrodes in order to change the molecular configuration of the liquid crystal material and, by doing so, open or close a shutter opening to light.

A liquid crystal shutter operating in this manner is disclosed in Japanese Patent Laid-Open Publication No. 193522/83. This liquid crystal shutter improved response speed by about one hundred (100) times compared with conventional liquid crystal shutters in which the molecular orientation of the liquid crystal material was changed depending on the voltage level. This development made it possible to use the shutter to expose the photosensitive surface of a rotating drum and to print data at high speeds.

When the high frequency signal used to open the shutter is applied continuously to the liquid crystal material over, a regular interval, mechanical vibrations due to resonance of unknown origin arise on the electrode substrate used to assemble the liquid crystal cells. As a result, the molecular orientation of the liquid crystal material changes over time and the amount of light transmitted through the shutter opening also changes. Variation of the amount of light transmitted is disadvantageous and impedes use of such shutters.

Accordingly, it is desirable to provide a liquid crystal shutter wherein the amount of light transmitted is stable over time and which overcomes the disadvantages inherent in prior art liquid crystal shutters.

SUMMARY OF THE INVENTION

According to the present invention, a liquid crystal shutter which stabilizes the molecular orientation of a liquid crystal material incorporated therein is provided. The liquid crystal material is stabilized by isolation electrodes in the regions between and parallel to elongated common electrodes on one substrate. Signal electrodes are disposed on the opposed substrate and are arranged in perpendicular and skew positional relationship to the common electrodes. The signal electrodes are arranged so that there is a gap in the signal electrode in the region between common electrode which is greater than the thickness of the layer of liquid crystal material. In another embodiment of the invention, the liquid crystal material is one which undergoes a frequency dependent inversion of dielectric anistropy.

It is an object of the present invention to provide an improved liquid crystal shutter in which mechanical vibrations due to high frequency signals are prevented and in which the amount of light transmitted remains constant over time.

It is another object of the invention to provide a liquid crystal shutter in which isolation electrodes are disposed between elongated common electrodes.

It is a further object of the invention to provide a liquid crystal shutter in which the effective gap distance between signal electrodes in the region between crossing common electrodes is large enough to prevent mechanical vibrations due to high frequency signals.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

A liquid crystal shutter wherein the molecular orientation of a frequency dependent liquid crystal material is stabilized is provided. The shutter includes elongated common electrodes positioned in parallel spaced relationship to each other on one electrode substrate. Isolation electrodes are provided on the substrate in the region between the common electrodes and the isolation electrodes extend parallel to the common electrodes. Signal electrodes are disposed on the opposed substrate in such a way as to be perpendicular with a skewed region with respect to both the common and the isolation electrodes. In a second preferred embodiment of the invention, the molecular orientation of the electrodes is stabilized by controlling the effective gap distance between signal electrodes in the region between crossing common electrodes.

For a better understanding of the liquid crystal shutters constructed and arranged in accordance with the invention, reference is made to the following examples. These examples are presented for purposes of illustration only and are not intended in a limiting sense.

EXAMPLE 1

Figure 1:
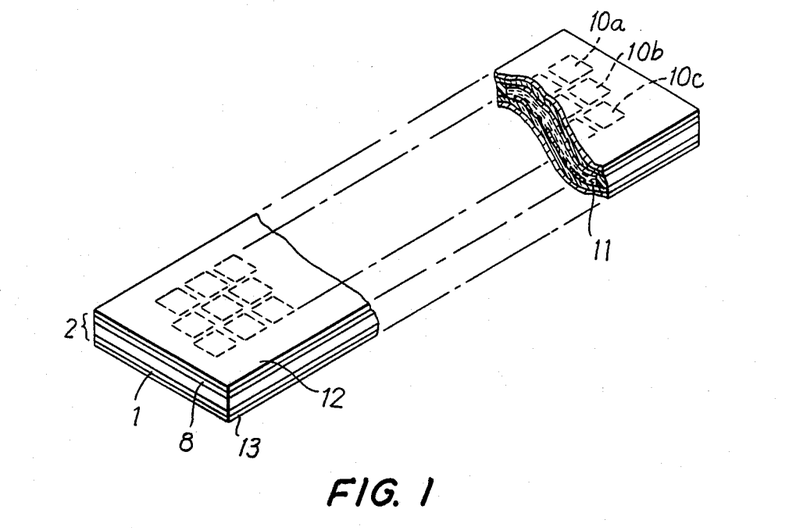
FIG. 1 is a perspective view of a liquid crystal shutter in accordance with the present invention.
Figure 2:
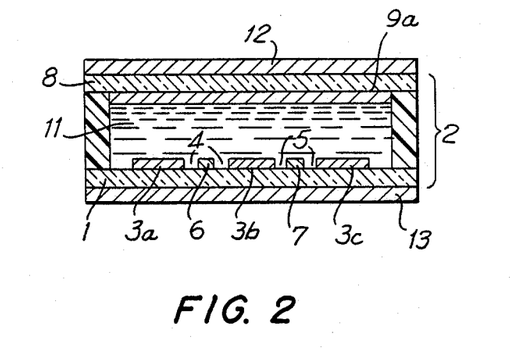
FIG. 2 is a cross-sectional view of the liquid crystal shutter shown in FIG. 1.
Figure 3:
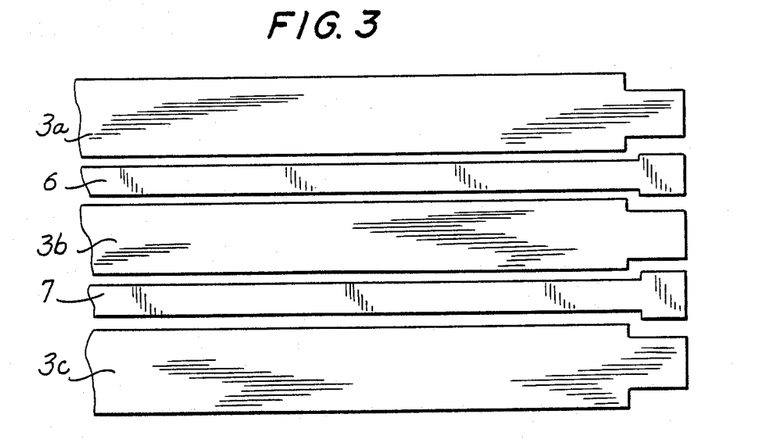
FIG. 3 is a plan view of elongated electrodes on the common electrode plate of the shutter of FIG. 1.
Figure 4:
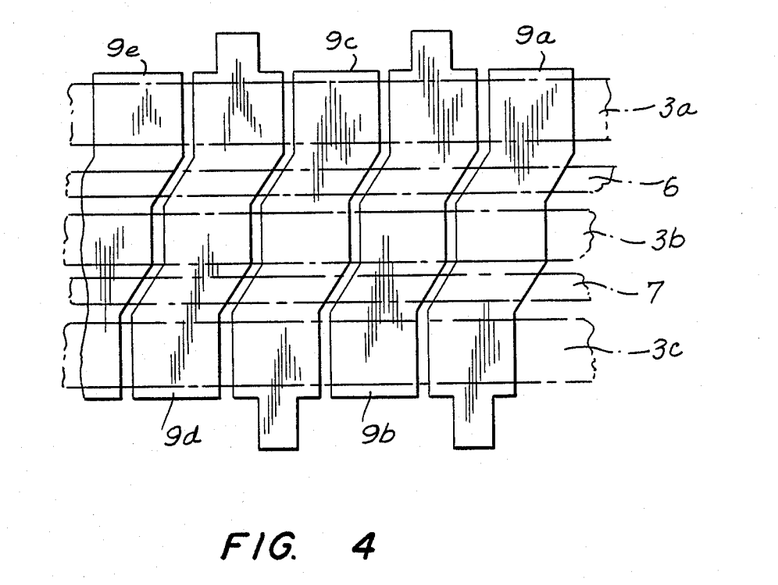
FIG. 4 is a plan view of the signal electrodes with the common electrodes shown in phantom.

FIGS. 1 and 2 show a first embodiment of the present invention. A substrate 1 of a liquid crystal shutter 2 is constructed of a rectangular transparent electrical insulator such as glass or the like. Three (3) common electrodes designated 3a, 3b and 3c are disposed on substrate 1 on the side adjacent a liquid crystal material 11. Common electrodes 3a, 3b and 3c are formed of a transparent electrically conductive material and are disposed in parallel relation to each other in the lengthwise direction along substrate 1. Regular regions 4 and 5 are provided between common electrodes 3a, 3b and 3c.

A pair of isolation electrodes 6 and 7 are disposed in the regions 4 and 5 so as to be parallel to common electrodes 3a, 3b and 3c. Isolation electrodes 6 and 7 are formed of elongated electrically conductive strips and provide a significant feature of the invention. An opposed second substrate 8 is formed of a rectangular transparent electrical insulator such as glass or the like. A plurality of signal electrodes 9a, 9b, 9c, 9d, 9e and so forth are disposed on the surface of substrate 8 and are in contact with a liquid crystal material 11 in the space between substrates 1 and 8. Signal electrodes 9a, 9b, 9c, 9d, 9e are each made of a transparent electrical conductor and are arranged to be perpendicular to the common electrodes 3a, 3b and 3c with a region in skew positional relationship thereto. An array of shutter areas 10a, 10b, 10c and so forth are formed in the portions where common electrodes 3a, 3b and 3c and signal electrodes 9a, 9b, 9c, 9d, 9e cross in plan view.

In a preferred embodiment of the invention, liquid crystal material 11 is prepared using the fllowing three compounds:

| Compound | | Percent |
|---|---|---|
| (1) R₁—⟨H⟩—COO—⟨O⟩—O—R₁' | | 60 (wt %) |
| (2) R₂—⟨O⟩—COO—⟨O⟩(CN,CN)—COO—⟨O⟩—R₂' | | 20 (wt %) |
| (3) R₃—⟨O⟩—COO—⟨O⟩—COO—⟨O⟩(Cl)—CN | | 20 (wt %) | wherein $R_1$, $R_2$, $R_3$, $R_{1'}$ and $R_{2'}$ are alkyl radicals having 1 to 20 carbon atoms, alkoxy radicals having 1 to 20 carbon atoms and cyano radicals. Furthermore, 2–3% by weight of the optical activator having the following formula:

C₆H₁₃—O—⟨O⟩—COO—⟨O⟩—COO—2-d-C₈H₁₇ is added to the above composition.

One example of the above composition is as follows:

TABLE 1

| Compound | WT % | |
|---|---|---|
| (1) C₃H₇—⟨H⟩—COO—⟨O⟩—OC₂H₅ | 20 | 60 |
| C₅H₁₁—⟨H⟩—COO—⟨O⟩—O—CH₃ | 20 | |
| C₄H₉—⟨H⟩—COO—⟨O⟩—OC₂H₅ | 10 | |
| C₉H₁₉—⟨H⟩—COO—⟨O⟩—OC₇H₁₅ | 10 | |
| (2) C₂H₅—⟨O⟩—COO—⟨O⟩(CN,CN)—COO—⟨O⟩—C₆H₁₃ | 7 | 20 |
| C₅H₁₁—⟨O⟩—COO—⟨O⟩(CN,CN)—COO—⟨O⟩—C₆H₁₃ | 7 | |
| C₃H₇—⟨O⟩—COO—⟨O⟩(CN,CN)—COO—⟨O⟩—OC₂H₅ | 6 | |
| (3) C₅H₁₁—⟨O⟩—COO—⟨O⟩—COO—⟨O⟩(Cl)—CN | 10 | 20 |
| C₈H₁₇—⟨O⟩—COO—⟨O⟩—COO—⟨O⟩(Cl)—CN | 5 | |
| C₂H₅—⟨O⟩—COO—⟨O⟩—COO—⟨O⟩(Cl)—CN | 5 | |

Liquid crystal material 11 has a predetermined crossover frequency, $f_c$, where the rate of change in permittivity, $\Delta\epsilon$, is inverted. At a frequency $f_h$, higher than the crossover frequency, $f_c$, the liquid crystal material has dielectric anistropy such that the macroaxes of the liquid crystal molecules are oriented substantially perpendicularly to the substrates. When the rate of change of permittivity, $\Delta\epsilon$, changes from negative to positive upon application of a field having a frequency $f_l$, lower than the crossover frequency, $f_c$, the macroaxes of the liquid crystal material orient in parallel to the substrates.

Compound (1) is used in order to reduce the viscosity of the liquid crystal material and the relaxation frequency. The relaxation frequency is reduced to a figure down one place in driving frequency, for example, as compared with a biphenyl liquid crystal.

Compound (2) is used to increase the absolute value of the rate of change in permittivity of the liquid crystal molecules in a high frequency range. In other words, light permeability is improved.

Compound (3) is used to increase the absolute value of the rate of change of permittivity of the liquid crystal molecules in a low frequency range. In other words, the shading properties are improved.

A pair of polarizing plates 12 and 13 are disposed on the upper and lower surfaces of the liquid crystal shutter 2. The polarizing axes of polarizing plates 12 and 13 are perpendicular to each other.

Figure 5:
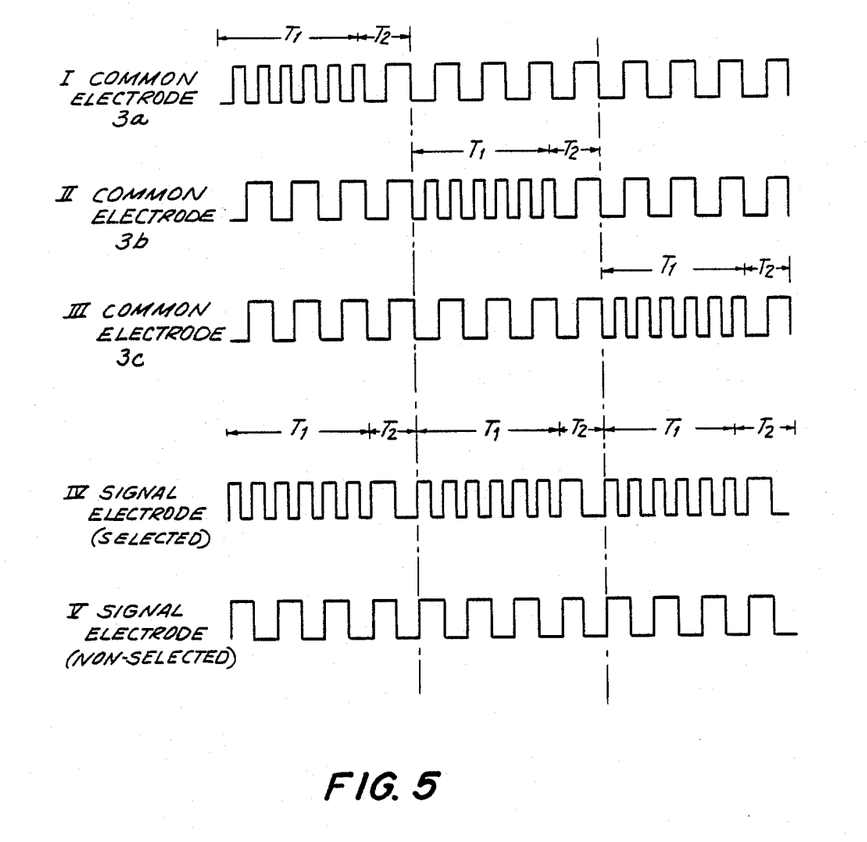
FIG. 5 are driving waveforms for driving the shutter of FIG. 1.

FIG. 5 shows driving signals used to drive the liquid crystal shutter in this embodiment of the invention. As shown in the transmissivity curves I to III of FIG. 5, one of the common electrodes, the selected common electrode, is supplied with a high frequency signal $f_h$ of about 70 KHz for a predetermined period of time, $T_1$, and then a low frequency signal $f_l$ of about 500 Hz for a second predetermined period of time, $T_2$. The other common electrodes, i.e. the non-selected common electrodes, are driven using only a low frequency signal $f_l$.

As shown in curve IV of FIG. 5, one of the signal electrodes, the selected signal electrode, is supplied with the same signal $f_h$ as that supplied to the selected common electrode but opposite in phase. The other signal electrodes, i.e. the nonselected signal electrodes, are supplied with the same signal $f_l$ as that supplied to the non-selected common electrodes, but also opposite in phase.

As can be seen, a high frequency signal was supplied to a selected common electrode 3a in order to put the selected common electrode into its selected state. At the same time, a low frequency signal was supplied to the non-selected common electrodes, 3b and 3c, in order to put them into their non-selected state. Also simultaneously, isolation electrodes 6 and 7 were maintained in a floating state. Under these conditions when a selected signal was supplied to a selected signal electrode, such as 9a and a non-selected signal was supplied to the non-selected signal electrodes, such as 9b, 9c, 9d, 9e, the shutter area 10a was placed into a selected state. The liquid crystal material 11 in the region of shutter area 10a was subjected to a high frequency electric field and the macroaxes of the liquid crystal molecules were oriented parallel to the substrates 1 and 8 at high speed. In this manner, shutter area 10a is opened.

Figure 6:
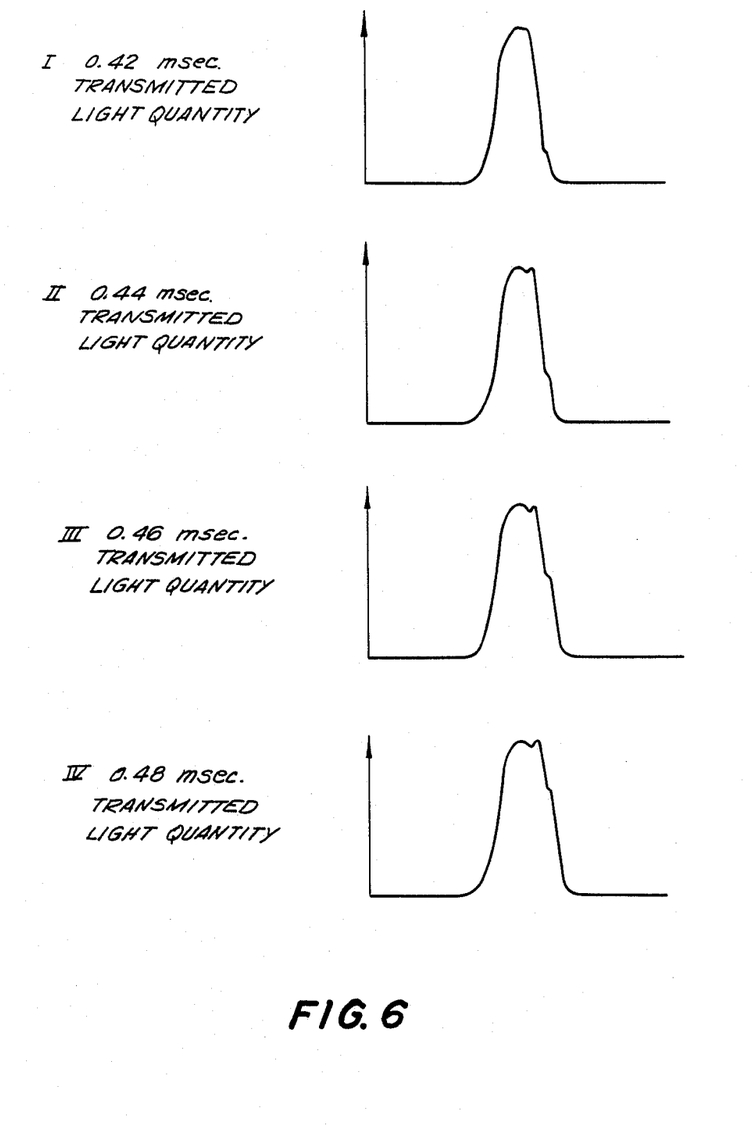
FIG. 6 are transmissivity curves showing the response characteristics of the liquid crystal shutter of FIGS. 1–3.

The change in the amount of light transmitted through a shutter area was measured as the application time of the high frequency signal onto the selected signal electrodes was changed from 0.42 msec to 0.48 msec in step intervals of 0.02 msec. The opening time of the shutter opening area was within the range at which vibrations are generally generated in conventional liquid crystal shutters. The response characteristics of the shutter areas measured by the amount of light transmitted when selected are shown in FIG. 6 (I-IV). As can be seen, no vibratory fluctuation in the amount of light transmitted occurred and stable exposure was obtained.

Figure 11:
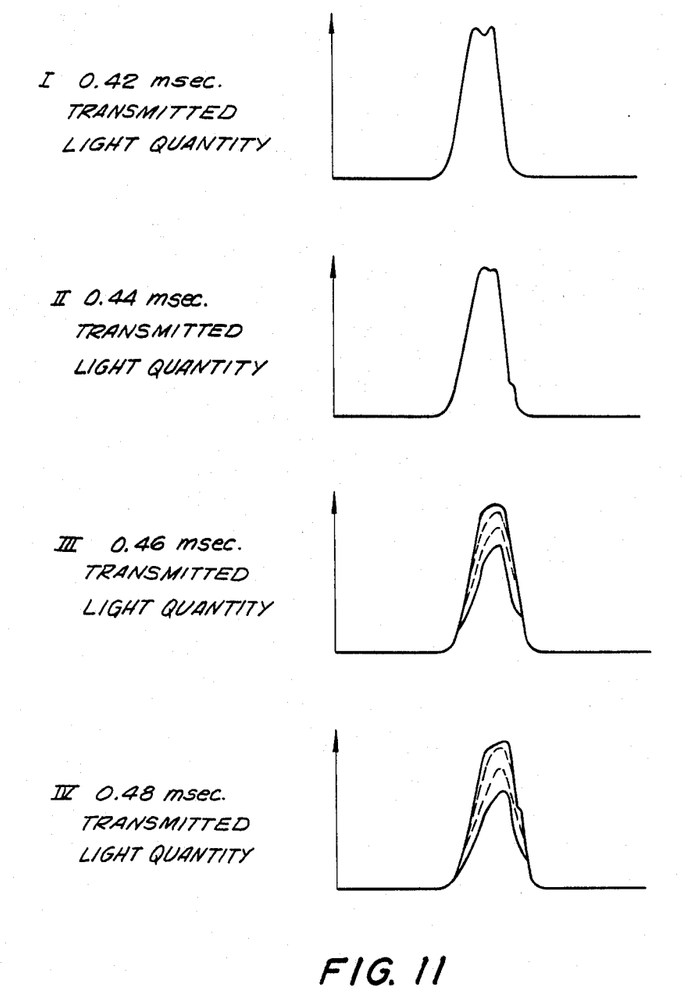
FIG. 11 are transmissivity curves showing the response characteristics of conventional liquid crystal shutters including a frequency dependent liquid crystal material.

A conventional liquid crystal shutter not including isolation electrodes between the common electrodes was tested under the same experimental conditions. The change in the amount of light transmitted was measured as the application time of the high frequency signal onto the selected signal electrodes was increased from 0.42 msec to 0.48 msec in step intervals of 0.02 msec. The response characteristics of the conventional liquid crystal shutters are shown in FIG. 11. As can be seen, vibratory fluctuation in the quantity of light transmitted was measured at the point where application time of the high frequency signal was over 0.46 msec. Transmissivity curve III of FIG. 11 indicates that the quantity of light transmitted was unstable.

The test results do not explain the mechanism by which the isolation electrodes contribute to the prevention of mechanical vibrations. They do, however, confirm that including isolation electrodes between the common electrodes in accordance with this embodiment of the invention is an effective means for preventing mechanical vibration from occurring at the time of selection.

A low frequency signal was applied to non-selected signal electrode 9a in order to put shutter area 10a in a non-selected state. This occurs when the amount of light transmitted through shutter opening area 10a is constant. When the liquid crystal material within the opening area was subjected to a low frequency electric field, the macroaxes of the liquid crystal molecules orient perpendicular to substrates 1 and 8 at high speed in order to close the shutter opening area.

Subsequently, when the signal electrodes are scanned, the shutter opening areas located above the common electrode 3a were successively opened to complete the scanning in the direction of the row. At this point, when the row direction scanning was performed with respect to the second common electrode 3b by supplying a high frequency signal to this common electrode 3b, isolation electrodes 6 and 7 prevented vibrations from occurring in substrates 1 and 8. As a result, exposure control was stable.

As shown in this embodiment, the isolation electrodes were maintained in a floating state. However, when the isolation electrodes were supplied with a low frequency signal, a positive or negative direct current voltage, or grounded, similar effects were observed. As long as a plurality of common electrodes were separated from each other by electrically conductive bands or belts, i.e. isolation electrodes, mechanical vibrations were prevented and the amount of light transmitted by the selected shutter openings is constant.

EXAMPLE 2

Figure 7:
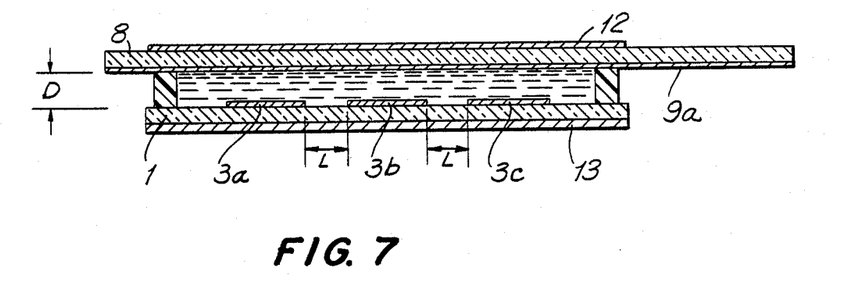
FIG. 7 is a cross-sectional view showing a second embodiment of a liquid crystal shutter in accordance with the invention.

FIG. 7 shows a second embodiment of a liquid crystal shutter constructed in accordance with the invention. Identical elements to the embodiment of FIG. 1 are identified by the same reference numerals. Three (3) common electrodes 3a, 3b and 3c are formed on a transparent electrically insulating substrate 1 at regular intervals L. Substrate 1 is a transparent plate of glass or plastic film, or, alternatively, at least the optical shutter portion of the substrate is transparent. A signal electrode 9a formed of a transparent electrically conductive material such as indium oxide, tin oxide, mixtures of indium oxide and tin oxide or the like is provided on an opposed transparent electrically insulating substrate 8. Signal electrode 9a is perpendicular and in skew positional relationship to the common electrodes. Shutter opening areas are formed in the overlapping regions of signal electrode 9a and common electrodes 3a, 3b and 3c.

Figure 8:
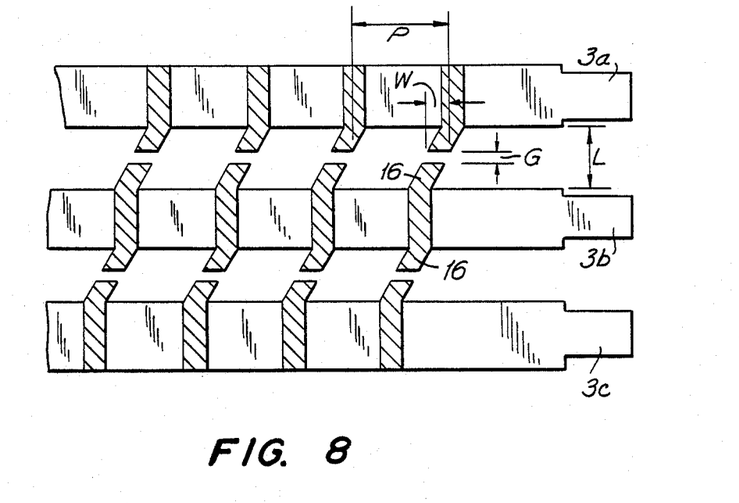
FIG. 8 is a plan view showing the structure of the common electrodes of the shutter of FIG. 7.
Figure 10:
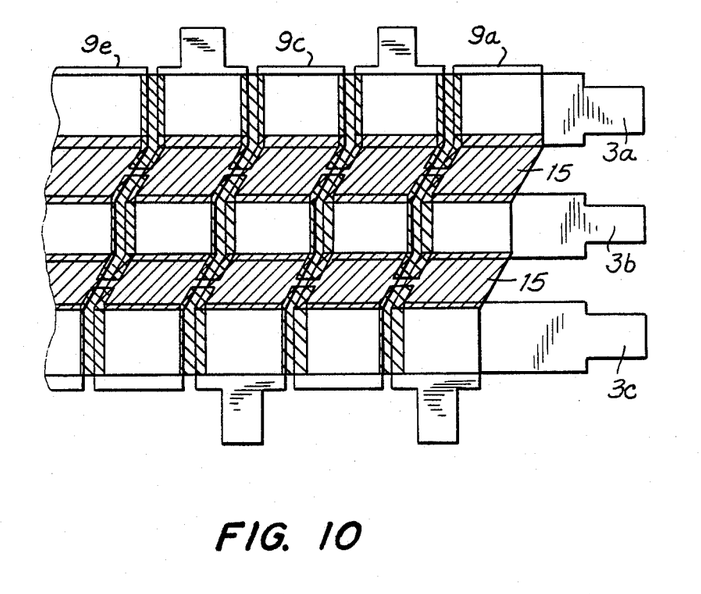
FIG. 10 is a plan view showing the overlapping relationship of the common and signal electrodes on the shutter of FIG. 7.

FIG. 8 shows common electrodes 3a, 3b and 3c formed on substrate 1 at regular intervals, L, relative to the depth, D, of the liquid crystal material layer. The distances between the common electrodes 3a, 3b and 3c, i.e. L, were equal to 90 μm, and the depth, D, of the liquid crystal material layer was 5 μm. The depth, D, of the liquid crystal material layer is considered to be equal to the distance between the opposing substrates. An opaque region 15 on signal electrodes 9a-9e for blocking light, shown using oblique lines in FIG. 8 was provided in order to prevent light leakage from passing through each portion of the electrode with the exception of the shutter portions. As has been described, the shutter portions are formed when common electrodes 3a, 3b and 3c are placed opposite to signal electrodes 9a–9e so that the common electrodes cross the signal electrodes in a perpendicular and skew positional relationship as shown in FIG. 10. The opaque regions are formed of a shaded metal electrode or a shaded layer of colored resin, gelatin or the like formed by printing, photolithography or the like. The shaded metal electrode can be obtained by plating aluminum, copper, silver, gold, nickel or the like onto a transparent electrode using either electroplating or electroless plating.

Figure 9:
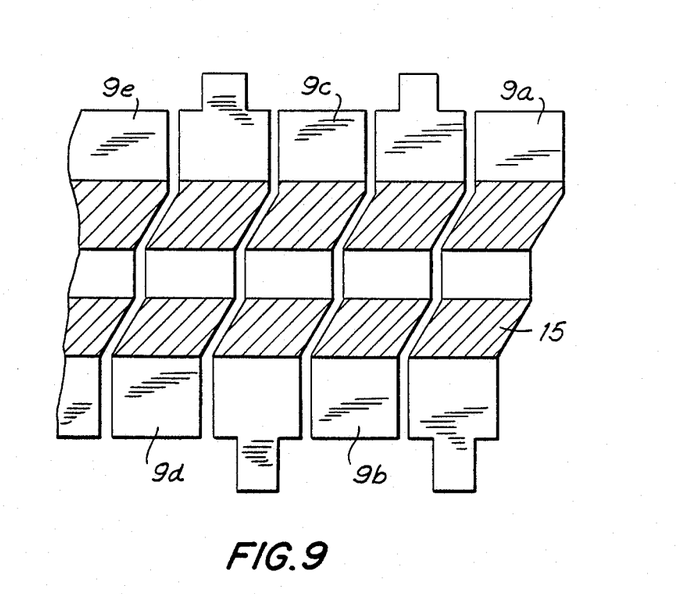
FIG. 9 is a plan view of the signal electrodes of the shutter of FIG. 7.

FIG. 9 shows opaque regions provided on substrate 8 except at the shutter portions. Signal electrodes 9a–9e are formed on substrate 1 and opaque region 15 of shaded metal electrodes or the like are disposed on signal electrodes 9a–9e at the oblique regions of the signal electrodes. Opaque metal is not provided at the shutter portions formed at the electrode crossing regions of the signal electrodes and the common electrodes. Opaque regions are provided in order to prevent light from passing through the gap between the common electrodes 3a, 3b and 3c as shown in FIG. 8.

Common electrodes 3a, 3b and 3c are elongated and spaced apart from each other with projecting regions 16 extending from one side or, alternatively from opposite sides of each common electrode in the regions where signal electrodes 9 cross. Opaque material is disposed on the projections to prevent light from leaking through the spaces between the electrodes.

FIG. 10 illustrates the overlapping configuration of the common electrodes 3a, 3b and 3c on substrate 1 and signal electrodes 9a, 9b, 9c, 9d, 9e on substrate 8. Liquid crystal material layer is sandwiched between substrates 1 and 8. Shaded projections 16 extending from common electrodes 3a, 3b and 3c on substrate 1 minimize light leakage in the gaps between the signal electrodes and the common electrodes. In this configuration, the effective gap distance, $L_{eff}$, between the common electrodes is expressed as:

$$1/L_{eff} = ((P-W)/P) \times 1/L + (W/P) \times 1/G$$

wherein W represents the width of each projection, L represents the gap distance between the common electrodes, G represents the gap distance between each of the signal electrodes, and P represents the pitch of repetition of the projections.

When $L_{eff}$ is much greater than the depth of the liquid crystal material layer, D, that is, the distance between opposing substrates 1 and 8, the liquid crystal shutter can be operated stably.

The relationship between the depth, D, of a liquid crystal layer, the distance between opposing electrode substrates, and the gap distance between the common electrodes, L, is expressed by the following equation:

$$l = n \times D$$

wherein n is an integer greater than 0.

In a conventional assembly wherein n was less than 5, the liquid crystal shutter did not include isolation electrodes. In this case, the amount of light transmitted was unstable as shown in FIG. 11. This phenomenon is objectionable in connection with graphic imaging and the like.

In another assembly wherein n was equal to 10, the liquid crystal shutter can operate like the shutter of Example 1 as if isolation electrodes had been included. The amount of light transmitted was stable even when the period of application of high frequency signal was as high as 0.48 msec.

When n was greater than 10, for example, 12, 16, 18 and so forth, shutter vibration was prevented and the quantity of light transmitted was stable.

As has been shown, it has been found that the shutter vibration was prevented when the gap distance between common electrodes was sufficiently large in comparison to the depth of the liquid crystal material layer. As the gap distance increased, however, light leakage at the gap portions also increased. For this reason, the electrode structure shown in FIGS. 6(a), 6(b) and 6(c) was provided and light leakage was reduced to a minimum value. The ratio of the amount of transmitted light to the amount of nontransmitted light, i.e. the contrast ratio, that was necessary for shutter operation was also improved and high resolution was obtained.

In a preferred embodiment, the width of the projections, W, is 50 μm, the gap distance of the signal electrodes, G, is 20 μm, the distance between the common electrodes, L, is 90 μm, the repetition pitch of the projection, P, is 250 μm and the calculated effective gap distance, $L_{eff}$, between the common electrodes is 53 μm. The depth of the liquid crystal layer, D, is 5 μm. In this case, the value of $L_{eff}$, i.e. 53 μm, is more than 10 times the depth of the liquid crystal layer, D, which is 5 μm. Even when the liquid crystal shutter was driven under operating conditions such that the high frequency signal application time was 0.48 msec, it was possible to obtain constant transmittance of light without temporary vibrations.

Although this example shows a situation where the liquid crystal shutter is driven at ⅓ duty cycle resulting from the three (3) common electrodes, it is clear that the invention can be used in any liquid crystal shutter having 2 or more common electrodes. When the liquid crystal panel of Japanese Patent Laid-Open Publication No. 193522/83 was replaced by the liquid crystal shutter of this example to yield an optical graphic imaging apparatus, light emitted from a light source formed a clear latent image on a photosensitive drum. When the latent image was developed and transferred to recording paper and fixed, a clear printed image was obtained.

According to the present invention, it is possible to prevent vibration effectively at the time of electrode selection by providing an isolation electrode between adjacent common electrodes or by making the gap distance between adjacent common electrodes sufficiently large. Accordingly, a liquid crystal shutter having high response speed and a high degree of stability can be obtained. It is also possible to use a minimum output light source with a prolonged exposure because the shutter openings are stably maintained in an open state for an extended period of time.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a liquid crystal light shutter wherein light is transmitted through the shutter upon application of a voltage in a selection period and the amount of light tramsmitted through the shutter tends to fluctuate due to vibrations in the liquid crystal when the voltage is applied to the shutter for longer periods of time, including:
   a first substrate;
   at least two common electrodes disposed on the first substrate parallel to an spaced apart from each other;
   a second substrate opposite to the first substrate spaced apart to form a cell therebetween;
   a plurality of spaced apart signal electrodes disposed on the second substrate and arranged so that the signal electrodes are substantially perpendicular to the common electrodes on the first substrate; and
   a liquid crystal material having frequency dependent dielectric anisotrophy enclosed in the cell between the substrates the improvement which comprises:
   at least one isolation electrode disposed on the first substrate parallel to and between the common electrodes, or by providing an opaque projection having a dimension P on the common electrodes at locations which cross the signal electrodes for minimizing light leakage and an effective gap distance between adjacent common electrodes that is at least about ten times greater than the distance between the opposing subtrates the effective gap distance $L_{eff}$, between common electrodes expressed as:

$$1/L_{eff} = ((P-W)/P) \times 1/L + (W/P) \times 1/G$$

wherein W represents the width of each projection, L represents the gap distance between common electrodes, G represents the gap distance between each signal electrode, and P represents the pitch of repetitions of the projections.

2. The liquid crystal shutter of claim 1, wherein the electrodes are elongated strips of an electrically conductive material.

3. The liquid crystal shutter of claim 2, wherein the electrically conductive material is selected from the group consisting of indium oxide, tin oxide, and mixtures of indium oxide and tin oxide.

4. The liquid crystal shutter of claim 1, wherein the first and second substrates are transparent in at least the region of the shutter opening areas.

5. The liquid crystal shutter of claim 1, wherein the liquid crystal material layer comprises:

wherein $R_1$, $R_2$, $R_3$, $R_{1'}$, and $R_{2'}$ are alkyl radicals having 1 to 20 carbon atoms, alkoxy radicals having 1 to 20 carbon atoms and cyano radicals.

6. In a liquid crystal light shutter wherein light is transmitted through the shutter upon application of a voltage in a selection period and the amount of light transmitted through the shutter tends to fluctuate due to vibrations in the liquid crystal when the voltage is applied to the shutter for longer periods of time, including:
   a first substrate;
   at least two elongated common electrodes disposed on the first substrate parallel to an spaced apart from each other;
   a second substrate opposite to the first substrate spaced apart to form a cell therebetween;
   a plurality of spaced apart signal electrodes disposed on the second substrate and arranged so that the signal electrodes are substantially perpendicular to the common electrodes on the first substrate; and
   a liquid crystal material having frequency dependent dielectric anisotrophy enclosed in the cell between the substrate, the improvement which comprises at least one isolation electrode on the first substrate parallel to and between the common electrodes.

7. The liquid crystal light shutter of claim 6, wherein the common and signal electrodes are elongated strips and the signal electrodes include at least one region in the center which is diagonally off-set from the ends thereof, whereby the shutter regions formed by the overlapping common and signal electrodes for forming the shutter region in adjacent common electrode are diagonally off-set.

8. The liquid crystal shutter of claim 6, wherein the electrodes are elongated strips of an electrically conductive material.

9. The liquid crystal shutter of claim 8, wherein the electrically conductive material is selected from the group consisting of indium oxide, tin oxide, and mixtures of indium oxide and tin oxide.

10. The liquid crystal shutter of claim 6, wherein the first and second substrates are transparent in at least the region of the shutter opening areas.

11. In a liquid crystal light shutter wherein light is transmitted through the shutter upon application of a voltage in a selection period and the amount of light transmitted through the shutter tends to fluctuate due to vibrations in the liquid crystal when the voltage is applied to the shutter for longer periods of time, including:
    a first substrate;
    at least two elongated common electrodes disposed on the first substrate parallel to an spaced apart from each other;
    a second substrate opposite to the first substrate spaced apart to form a cell therebetween;
    a plurality of spaced apart signal electrodes disposed on the second substrate and arranged so that the signal electrodes are substantially perpendicular to the common electrodes on the first substrate; and a liquid crystal material having frequency dependent dielectric anistrophy enclosed in the cell between the substrates;

the improvement which comprises, providing an opaque projection having a dimension P on the common electrodes at locations which cross the signal electrodes for minimizing light leakage and an effective gap distance between adjacent common electrodes that is at least about ten times greater than the distance between opposing substrates, the effective gap distance, $L_{eff}$, between common electrodes expressed as:

$$1/L_{eff}=((P-W/p)\times 1/L+(W/p)\times 1/G$$

wherein W represents the width of each projection, L represents the gap distance between common electrodes, G represents the gap distance between each signal electrode, and P represents the pitch of repetitions of the projections.

12. The liquid crystal shutter of claim 11, wherein the common and signal electrodes are elongated strips and the signal electrodes include at least one region in the center which is diagonally off-set from the ends thereof, whereby the shutter regions formed by the overlapping common and signal electrodes for forming the shutter region in adjacent common electrode are diagonally off-set wherein the diagonally off-set regions of the signal electrode in the regions between the shutter opening areas in plan view.

13. The liquid crystal light shutter of claim 11 wherein each common electrode has projections extending diagonally from the ends thereof into the region between crossing signal electrodes.

14. The liquid crystal shutter of claim 13, wherein the projections and portions of the common electrode between opposed projections are opaque and the common electrodes are transparent in the regions of the shutter openings.

15. The liquid crystal shutter of claim 11, wherein the electrodes are elongated strips of an electrically conductive material.

16. The liquid crystal shutter of claim 15, wherein the electrically conductive material is selected from the group consisting of indium oxide, tin oxide, and mixtures of indium oxide and tin oxide.

17. The liquid crystal shutter of claim 11, wherein the first and second substrates are transparent in at least the region of the shutter opening areas.

18. The liquid crystal shutter of claim 11, wherein the liquid crystal material layer comprises:

wherein $R_1$, $R_2$, $R_3$, $R_{1'}$ and $R_{2'}$ are alkyl radicals having 1 to 20 carbon atoms, alkoxy radicals having 1 to 20 carbon atoms and cyano radicals.

* * * * *